US005751601A

United States Patent [19]

Tang et al.

[11] Patent Number: 5,751,601

[45] Date of Patent: May 12, 1998

[54] AUTOCALIBRATION OF OPTICAL SENSORS

[75] Inventors: Manh Tang, Penfield; Keith A. Hadley, Rochester, both of N.Y.

[73] Assignee: Eastman Kodak Company, Rochester, N.Y.

[21] Appl. No.: 705,103

[22] Filed: Aug. 28, 1996

[51] Int. Cl.$^6$ .......... G02F 3/00

[52] U.S. Cl. .......... 364/526; 364/571.01; 364/571.02; 364/571.05; 347/177; 347/178

[58] Field of Search .......... 364/526, 252, 364/550, 551.01, 571.01, 571.02, 571.05, 571.08, 562, 713, 822; 250/559.49, 227.11, 341.5, 252.1 A; 356/239, 380, 386, 429–431, 402, 403, 411, 421, 425, 435; 400/120.01, 120.02, 120.09, 120.11, 120.18, 124.02, 236; 347/177, 178, 236; 73/1.73, 1.88, 1.01, 865.8, 865.9; 359/110, 288; 382/162, 167; 358/503, 504, 518; 503/227

[56] References Cited

U.S. PATENT DOCUMENTS

| | | | |
|---|---|---|---|
| 3,958,127 | 5/1976 | Faulhaber et al. | 250/559.49 |
| 4,710,781 | 12/1987 | Stephenson | 347/178 |
| 4,773,029 | 9/1988 | Claesson et al. | 364/562 |
| 4,870,854 | 10/1989 | Hoeel | 73/1.73 |
| 5,073,712 | 12/1991 | Hellstrom | 250/252.1 |
| 5,083,063 | 1/1992 | Brooks | 315/294 |
| 5,176,458 | 1/1993 | Wirth | 400/120.16 |
| 5,220,348 | 6/1993 | D'Aurelio | 347/236 |
| 5,327,770 | 7/1994 | Hindle | 73/863 |
| 5,439,871 | 8/1995 | Matoushek | 503/227 |
| 5,549,400 | 8/1996 | Tang et al. | 400/236 |

*Primary Examiner*—James P. Trammell
*Assistant Examiner*—Hal D. Wachsman
*Attorney, Agent, or Firm*—Nelson Adrian Blish

[57] ABSTRACT

A method of calibrating optical sensors for a thermal printer (10) is disclosed. A thermal printer for printing color images which uses a dye donor web having a repeating series of spaced frames of yellow, magenta and cyan colored heat transferable dyes, apparatus for identifying the different color frames of each series uses a source of second light and a source of first light. The apparatus responds to the intensity of second and first source light which passes through a dye donor frame to identify that dye donor frame. A CPU adjusts a digital potentiometer attached to a photodetector to determine a series of values for a first dye donor frame. The procedure is repeated for a second series of values for a second dye donor frame. An absolute value of the different potentiometer values for the two dye donor frames is determined, and the CPU adjusts the potentiometer setting to the maximum value determined. In another embodiment, a midpoint value is determined for the color sensor, and upper and lower threshold values are determined. In yet another embodiment, similar calculations are obtained for a second photodetector and a second potentiometer.

18 Claims, 4 Drawing Sheets

AUTOCALIBRATION OF OPTICAL SENSORS

BACKGROUND OF THE INVENTION

1. Field of the Invention

This invention relates generally to optical sensors and in particular to calibration of optical sensors for identifying different color dye donor frames on a dye donor web of a thermal printer.

2. Description of Related Art

The present invention is particularly useful in a printer apparatus wherein a web of dye donor is advanced from a supply roll, past a thermal print head, to a motorized take-up roll. Referring to FIG. 1, a thermal printer 10 includes a print head assembly 12; dye donor web supply roll 14 and take-up roll 16, contained in a cartridge 17; a roller platen assembly 18; a pair of pinch rollers 20 and 22; a dye receiver transport guide 30; and a dye receiver supply 24.

Normal thermal printer operation includes loading dye receiver, printing information upon the dye receiver, and ejecting the finished print. Each of these operations is fully described in commonly-assigned U.S. Pat. No. 5,176,458, which issued on Jan. 5, 1993. Therefore only a brief description will be given of the illustrated embodiment of the thermal printer.

Printer operation begins with a loading phase, in which a sheet of dye receiver 28 advances from supply 24 along guide 30 to a gap between print head assembly 12 and platen assembly 18. The leading edge of dye receiver 28 is held in the nip of rollers 20 and 22. Print head assembly 12 moves toward roller platen assembly 18, pressing dye donor web 26 and the dye receiver 28 against roller platen assembly 18, to form a sandwich for thermal printing.

Print head assembly is comprised of a print head 13 and a heatsink 15. Referring to FIG. 2, the print head 13 of print head assembly 12 includes a plurality of heating elements 32, such as electrical resistors. When one of a plurality of switches 34 is closed, the associated heating element 32 is connected to a voltage potential source $V_s$.

Dye donor web 26, shown in FIG. 3, comprises a leader portion 27 followed by a repeating series of dye donor frames. The dye donor frames may be contiguous or spaced by interframe regions 29, as shown in FIG. 3. In operation, a yellow frame and the dye receiver 28 are positioned under the print head 12 and as they are advanced, the heating elements 32 are selectively energized to form a row of yellow image pixels on the dye receiver 28. This process is repeated until a yellow dye image is formed on the receiver. Next, the magenta frame is moved under the print head 12 and the dye receiver 28 is also moved under the print head 12. Both the sheet and the magenta frame are moved as the heating elements 32 are selectively energized and a magenta image is formed, superimposed upon the yellow image. Finally, as a cyan dye donor frame and the dye receiver are moved under the print head 12, the heating elements are selectively energized and a cyan dye image is formed on the dye receiver superimposed upon the yellow and magenta dye images. These yellow, magenta, and cyan dye images, in combination, form a color image. A single series is used to print one color image on the sheet 28 of dye receiver medium. Dye donor web 26 may also be black for printing text, and for other applications.

Since the carrier has a repeating series of yellow, magenta and cyan dye donor frames, it is important to identify all color frames. One way to identify the leading yellow color frame is to employ an optical sensor 40, shown in FIG. 3. The optical sensor 40 identifies a yellow dye donor frame by producing a particular analog signal in response to light which passes the dye donor frame. A reader station is provided which includes a plurality of photodetectors 42 which are aligned to produce a particular output signal representing the color of the following color frame. A typical system has two LED's (Light Emitting diodes) 36 and 38, as shown in FIG. 3, which illuminate the dye donor web from above. LED 36 emits blue light and LED 38 emits green light. Two photodetectors 42 are disposed below the dye donor web and receive light which passes through the dye donor web. Photodetectors 42 provide signals for identifying the start of each series, and each individual color dye donor frame in such series. For example, if light from blue LED 36 is blocked and light from green LED 38 is blocked, the dye donor frame is magenta, as shown in Table 1 below. For a more complete discussion of this type of identification system, reference is made to commonly assigned U.S. Pat. No. Re. 33,260 to S. Stephenson, which uses a red LED and a green LED to detect yellow, magenta, and cyan.

TABLE 1

| | Green LED 38 | Blue LED 36 |
|---|---|---|
| Clear | Passed | Passed |
| Yellow | Blocked | Passed |
| Magenta | Blocked | Blocked |
| Cyan | Passed | Blocked |

Referring to FIG. 4, a typical optical sensor 40 is shown. The wavelength of light emitted by commercially available LEDs is not exactly the same as the wavelength of light absorbed by the dye used in the donor web 26, therefore, the light from each LED is not 100% blocked nor 100% passed. Also, there may be drift in the optical sensor circuitry over time, and there may be differences in light absorbed by replacement donor webs. Therefore, adjustment of the optical sensor system is required.

One of the typical ways of compensation is to numerically adjust the gain of the photodetector 42, as shown in FIG. 4. Assume that the "Blocked" condition will produce a "1" at the output and the "Passed" condition will produce a "0" at the output. For example, the gain potentiometer 46 of the photodetector must be adjusted such that the photodetector 42 will produce a voltage that is higher than a threshold when a yellow dye donor frame 44 is placed between blue LED 36 and photodetector 42, and produce a voltage that is lower than the threshold when a magenta donor is placed between blue LED 36 and photodetector 42.

The above method suffers a disadvantage in that the threshold value is fixed, and once the potentiometer is adjusted at the factory it will stay set. Therefore, if there is any drift in the system such as LED or photodetector sensitivity drift due to aging or temperature, or minor misalignment during transit, the system will cease to operate correctly. This also applies when there is variation in the color of the frames of the dye donor web. Any of the above problems, or a combination thereof, could result in malfunction of the optical sensor.

SUMMARY OF THE INVENTION

It is an object of the present invention to provide an optical sensor to automatically detect dye donor color. It is also an object of the invention to automatically compensate for component variations during manufacture, and automatically recalibrate optical sensors in the field to correct for drift.

A method of calibrating an optical sensor system according to the present invention comprises the steps of:

a(1). setting a first potentiometer to a position P(i);

a(2). illuminating a first dye donor frame with a first color light, wherein said first dye donor frame blocks a substantial portion of said first light;

a(3). measuring an intensity of light transmitted through said first dye donor frame;

a(4). recording said intensity as A(i);

a(5). increasing i by land repeating steps a(1)–a(5) n times;

b(1). setting said first potentiometer to a position P(i);

b(2). illuminating a second dye donor frame with said first color light, wherein said second dye donor frame transmits a substantial portion of said first light;

b(3). measuring an intensity of light transmitted through said second dye donor frame;

b(4). recording said intensity as B(i);

b(5). increasing i by 1 and repeating steps b(1)–b(5) n times;

c(1). subtracting A(i) from B(i) and determining an absolute value C(i);

c(2). repeating steps c(1)–c(2) n times; and d(1). setting said first potentiometer to a position P(i) which corresponds to a largest value of C(i).

In particular, an optical sensor according to the present invention comprises a digital potentiometer, a CPU (Central Processing Unit), and an Analog to Digital converter. An LED transmits light through a dye donor frame to a photodetector. A signal from the photodetector is converted from an analog signal to a digital signal and compared to a threshold value for the dye donor frame by a CPU. The CPU adjusts a digital potentiometer to null out the difference between the reference standard and the signal received. The system can be applied generally to most optical sensor detection circuitry, although the specific application described herein is for optical sensors used to detect dye donor color in a thermal printer. The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art. While the invention is described below in the environment of a thermal printer, it will be noted that the invention can be used with other types of devices requiring calibration of optical color sensors.

Figure 1:
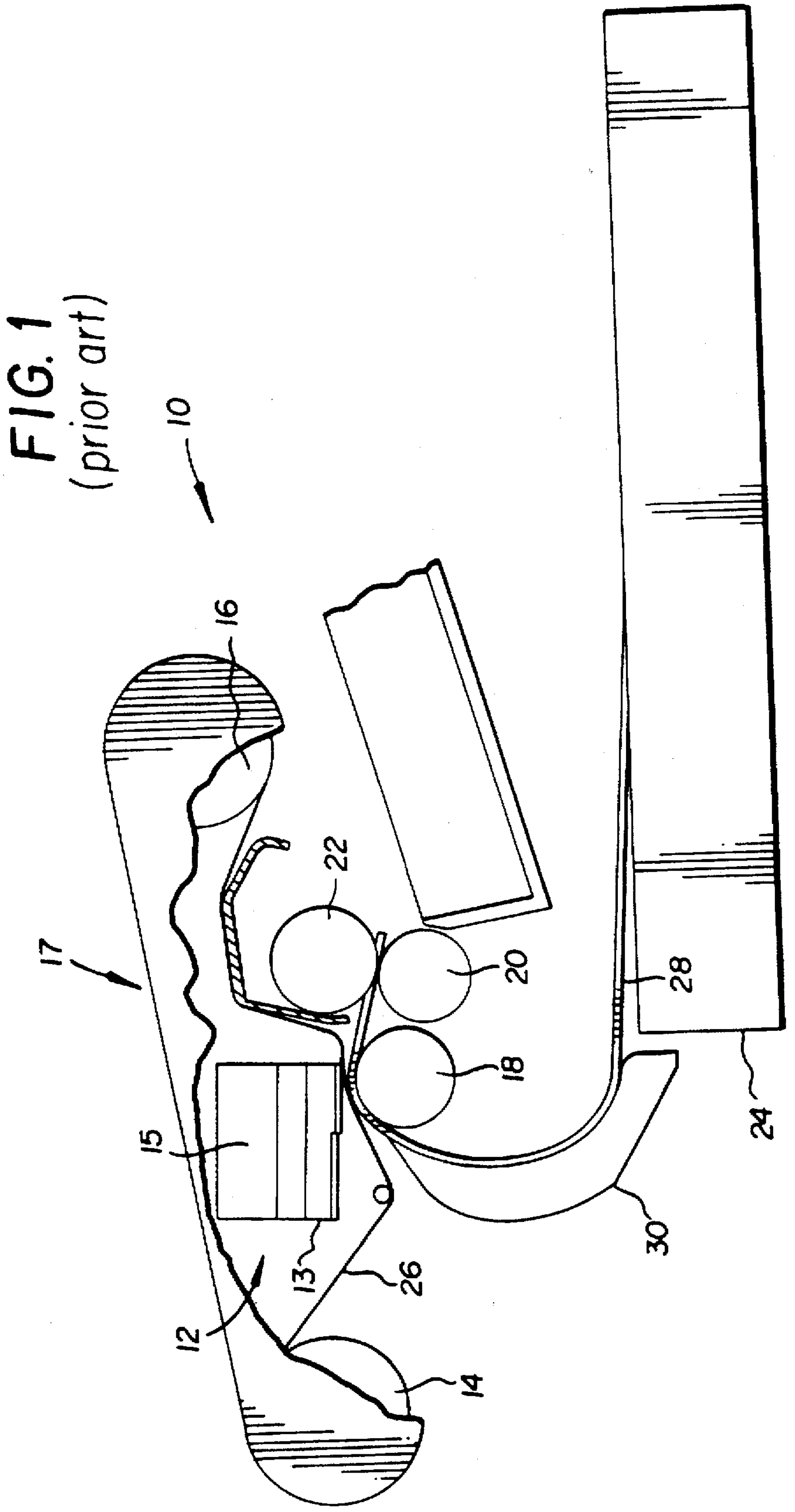
FIG. 1 (prior art)
FIG. 1 is a schematic of a thermal printer employed to make color images on a dye receiver medium in accordance with this invention.
Figure 2:
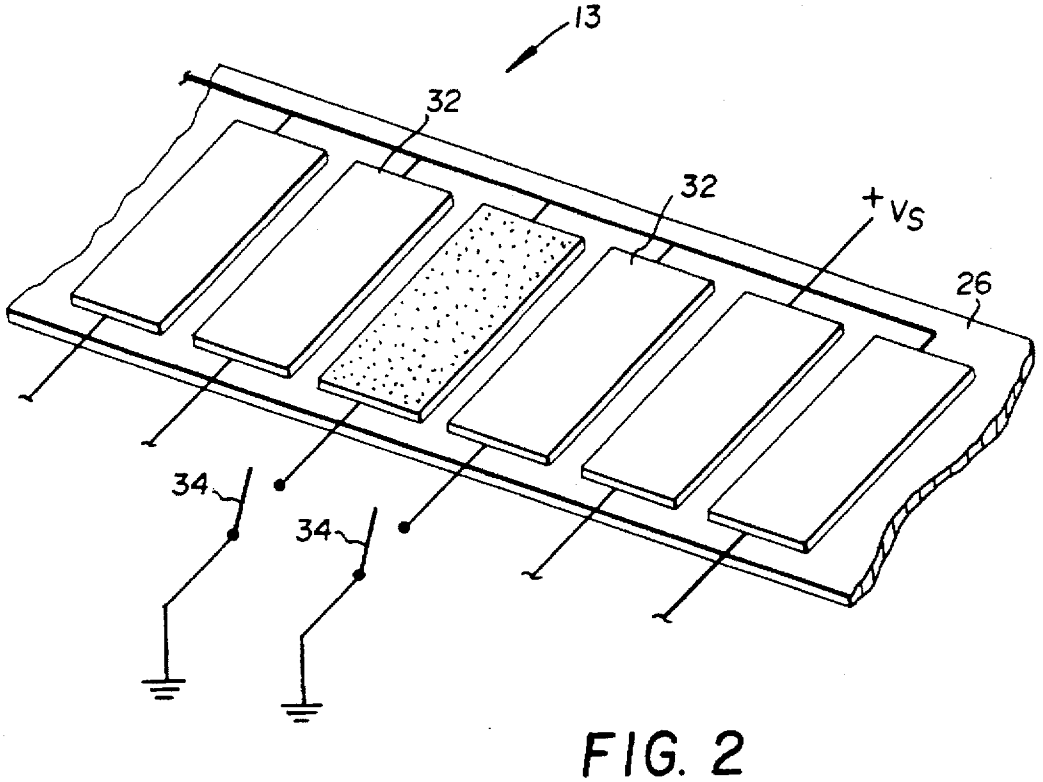
FIG. 2 (prior art)
FIG. 2 is a schematic perspective of several heating elements used in the print head of the printer of FIG. 1.
Figure 3:
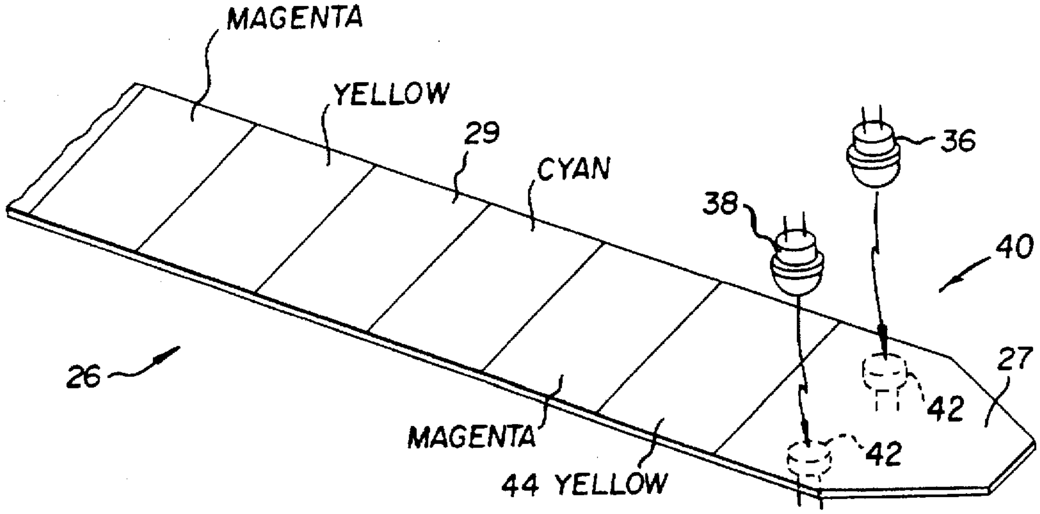
FIG. 3 (prior art)
FIG. 3 is a strip of dye donor medium used in the thermal printer of FIG. 1.
Figure 4:
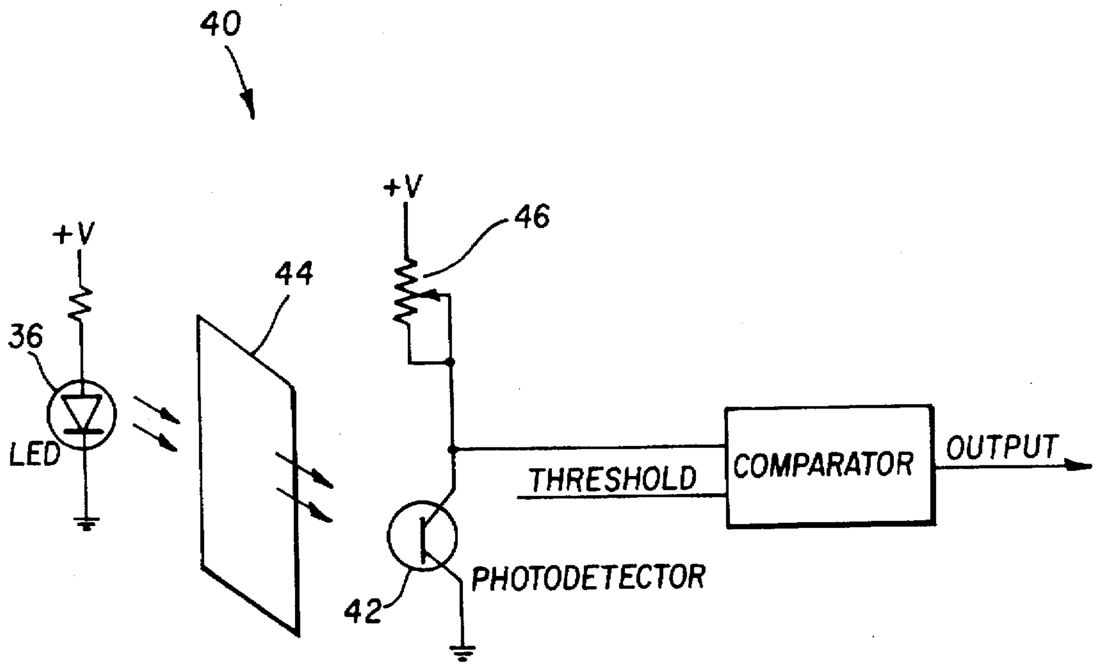
FIG. 4 (PRIOR ART)
FIG. 4 is a schematic perspective of a prior art color detection circuit.
Figure 5:
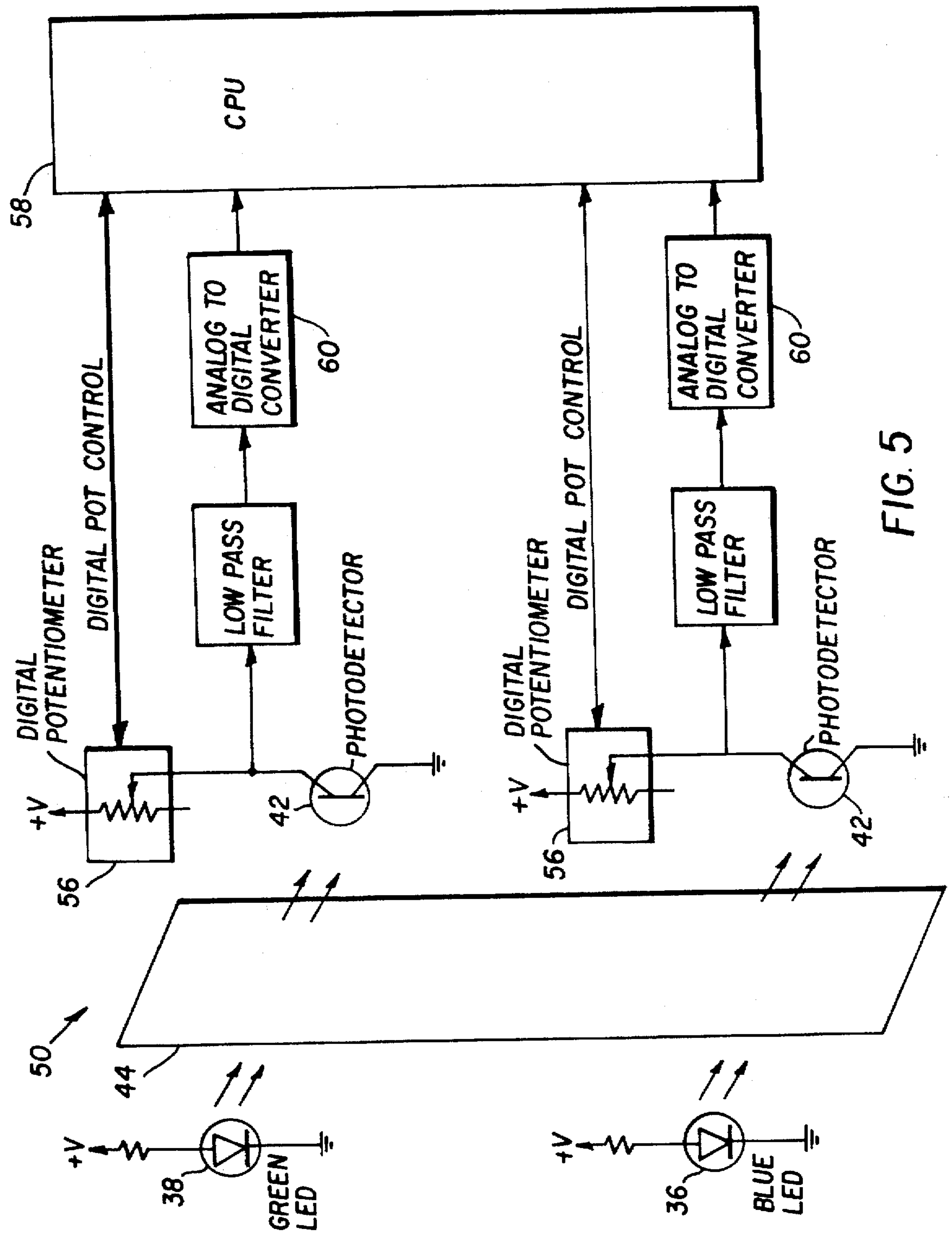
FIG. 5 is a schematic perspective of an optical sensor according to the present invention.

FIG. 5 shows an optical sensor 50, according to the present invention, with an autocalibration circuit. The major components of the autocalibration circuitry are a digital potentiometer 56, a CPU 58, and an analog to digital converter 60. The CPU used in the preferred embodiment is a Motorola MC68HC705P9 type which has 2K EPROM, 128 RAM, 4 channels, 8-bit analog to digital converter, 16-bit timer, 20 I/O pins in a 28-pin package. The digital potentiometer is a Xicor X9C10X.

The optical sensor is designed to automatically pick the optimum potentiometer setting. At initial setup on the assembly line, a dye donor frame is manually positioned between the sensor 42 and LEDs 36 and 38. The CPU varies the resistance of the digital potentiometer 56, from a minimum to a maximum setting for both the green channel and the blue channel, and reads the corresponding analog to digital converter values This process is repeated for all three donor colors: yellow, magenta, and cyan, and the information in Table 2 is collected.

TABLE 2

| Pot Wiper Position | Resistance Value* | Yellow Blue | Yellow Green | Magenta Blue | Magenta Green | Cyan Blue | Cyan Green |
|---|---|---|---|---|---|---|---|
| 1 | R | Vyb (1) | Vyg (1) | Vmb (1) | Vmg (1) | Vcb (1) | Vcg (1) |
| 2 | R | Vyb (2) | Vyg (2) | Vmb (2) | Vmg (2) | Vcb (2) | Vcg (1) |
| . | . | . | . | . | . | . | . |
| . | . | . | . | . | . | . | . |
| n | nR | Vyb (n) | Vyg (n) | Vmb (n) | Vmg (n) | Vcb (n) | Vcg (n) |

*for each digital potentiometer.
V = voltage
b = blue
c = cyan
g = green
m = magenta
y = yellow
For Example: Vyb(1) = Voltage at a first wiper position "(1)," with Yellow dye donor frame "y" and Blue LED "b"

The CPU then calculates the absolute value of the voltage difference (the spread) between the yellow dye donor frame and the cyan dye donor frame for the blue channel, and between the magenta dye donor frame and the yellow dye donor frame for the green channel as shown in Table 1. Any pair of donor colors that produces an opposite condition may be used. (The values in Table 3 below are specific to this example only.)

TABLE 3

| Pot Wiper Position | Blue Channel | Green Channel |
|---|---|---|
| 1 | Vb (1) = \|Vyb (1) − Vcb (1)\| | Vg (1) = \|Vmg (1) − Vyg (1)\| |
| 2 | Vb (2) = \|Vyb (2) − Vcb (2)\| | Vg (2) = \|Vmg (2) − Vyg (2)\| |
| . | . | . |
| . | . | . |
| . | . | . |

TABLE 3-continued

| Pot Wiper Position | Blue Channel | Green Channel |
|---|---|---|
| n | Vb (n) = \|Vyb (n) − Vcb (n)\| | Vg (n) = \|Vmg (n) − Vyg (n)\| |

To determine the blue threshold, a software algorithm, a computer program used by the CPU, scans through the Vb array for the potentiometer wiper position that gives the largest value of Vb. This is the optimum potentiometer setting for the blue photodetector, since it gives the largest voltage spread between the colors. A similar process is repeated for the green channel. Assuming the largest value of Vb is Vb(i) and the largest value of Vg is Vg(j), the midpoint thresholds should be set at:

$$\text{Midpt blue threshold}=[Vyb(i)+Vcb(i)]/2$$

$$\text{Midpt green threshold}=[Vmg(j)+Vyg(j)]/2$$

The final threshold for each channel should have an upper limit and a lower limit value to add robust into the system, i.e. making the system less sensitive to noise, drift of the photodetector, and variation in the dye donor web. These can be established by taking the midpoint threshold and adding a predetermined value to establish a margin.

For purposes of illustration, a margin of 1 Volt is used to establish upper and lower threshold values as follows:

upper blue threshold=Midpt. blue threshold+1 Volt lower blue threshold=Midpt. blue threshold−1 Volt upper green threshold=Midpt. green threshold+1 Volt lower green threshold=Midpt. green threshold−1 Volt During normal operation, a yellow color is recognized when its blue analog to digital converter value is larger than the upper blue threshold and its green analog to digital converter value is lower than the lower green threshold. Similarly, a magenta color is recognized when its blue analog to digital converter value is larger than the upper blue threshold and its green analog to digital converter value is larger than the upper green threshold. For the color cyan, the blue analog to digital converter value must be lower than the lower blue threshold and its green analog to digital converter value must be higher than the upper green threshold. Thus, the threshold setting is optimized for each LED detector pair. Therefore, component variations from lot to lot or within lot can be automatically corrected provided the variations are within the dynamic range of the system.

With the circuit configuration in FIG. 5, either the midpoint threshold values or the upper and lower threshold values should be stored in nonvolatile memory in CPU 58 so that they will be loaded upon printer power up. Also, in the preferred embodiment, the CPU should verify that Vmb(i) is larger than the upper blue threshold and Vmg(j) is larger than the upper green threshold for the color magenta. If this is verified, the CPU will adjust each digital potentiometer to the correct value and store the blue digital potentiometer wiper to position (i) and green potentiometer wiper to position (j). This will verify that other colors also respond correctly.

During normal operation at power up, the CPU will load the upper and lower thresholds for the blue and green channel from the nonvolatile memory. The CPU tests to determine whether the patch is a particular color by checking the analog to digital converter value readings for each channel as follows:

TABLE 4

| Color | ADC Value of Green | ADC Value of Blue |
|---|---|---|
| Clear | Lower than lower Green Threshold | Lower than lower Blue Threshold |
| Yellow | Lower than lower Green Threshold | Higher than upper Blue Threshold |
| Magenta | Higher than upper Green Threshold | Higher than upper Blue Threshold |
| Cyan | Higher than upper Green Threshold | Lower than lower Blue Threshold |

The CPU performs an autocalibration to correct for drift at certain interval, i.e. every time a new donor roll is put in. The procedure is the same as the initial setup procedure except that the printer will advance (or rewind) the donor to each color patch automatically without an operator inputting the color to the printer.

At the end of the autocalibration procedure, threshold levels and digital potentiometer wiper positions may be changed. A "warning" procedure is used to alert the user to schedule a field checkup if the drift is close to the end of the dynamic range of the system. Software can also perform the auto-calibration routine at a smaller interval than once per donor roll if it detects any large, sudden change in the detection circuitry. Other "intelligent" functions that utilizes this information can be built-in as well.

An optical sensor according to the present system performs autocalibration to correct for drift, provided that the drift is within the dynamic range of the circuitry. Both the digital potentiometer resistance and the threshold value can be adjusted during autocalibration software routines. Calibration can be carried out every time a new donor roll is installed. The initial setup can be automated which would speed up the assembly process and eliminate operator error variations in practice between operators.

The invention has been described in detail with particular reference to preferred embodiments thereof, but it will be understood that variations and modifications can be effected within the spirit and scope of the invention

PARTS LIST

10. Thermal printer
12. Print Head assembly
13. Print head
14. Dye donor web supply roll
15. Print head heatsink
16. Take-up roll
17. Cartridge
18. Roller platen assembly
20. Pinch roller
22. Pinch roller
24. Dye receiver supply
26. Dye donor web
27. Leader portion
28. Dye receiver
29. Interframe regions
30. Dye receiver transport guide
32. Heating elements
34. Switches
36. Blue LED
38. Green LED
40. Optical Sensor
42. Photodetectors
44. Yellow dye donor frame
46. Gain potentiometer
50. Optical Sensor
56. Digital potentiometer
58. CPU -continued

| PARTS LIST |
| --- |
| 60. Analog to digital converter |

What is claimed is:

1. A method of calibrating an optical sensor system, said method comprising the steps of:

a(1). setting a first potentiometer to a position P(i), wherein (i) equals a series of integers, and the series begins with-the numeral 1;

a(2). illuminating a first dye donor frame with a first color light, wherein said first dye donor frame blocks a substantial portion of said first color light;

a(3). measuring an intensity of light transmitted through said first dye donor frame;

a(4). recording said intensity as A(i);

a(5). increasing i by 1 and repeating steps a(1)–a(5) n times, wherein n is a predetermined integer;

b(1). setting said first potentiometer to a position P(i);

b(2). illuminating a second dye donor frame with said first color light, wherein said second dye donor frame transmits a substantial portion of said first color light;

b(3). measuring an intensity of light transmitted through said second dye donor frame;

b(4). recording said intensity as B(i);

b(5). increasing i by 1 and repeating steps b(1)–b(5) n times;

c(1). subtracting A(i) from B(i) and determining an absolute value C(i);

c(2). repeating steps c(1)–c(2) n times; and d(1). setting said first potentiometer to a position P(i) which corresponds to a largest value of C(i).

2. A method of calibrating an optical sensor system as in claim 1 further comprising the steps of:

e(1). setting a second potentiometer to a position P(i);

e(2). illuminating said first dye donor frame with a second color light, wherein said first dye donor frame blocks a substantial portion of said second color light;

e(3). measuring an intensity of light transmitted through said first dye donor frame;

e(4). recording said intensity as E(i);

e(5). increasing i by 1 and repeating steps e(1)–e(5) n times;

f(1). setting said second potentiometer to a position P(i);

f(2). illuminating said second dye donor frame with said second color light, wherein said second dye donor frame transmits a substantial portion of said second color light;

f(3). measuring an intensity of light transmitted through said second dye donor frame;

f(4). recording said intensity as F(i);

f(5). increasing i by 1 and repeating steps f(1)–f(5) n times;

g(1). subtracting E(i) from F(i) and determining an absolute value G(i);

g(2). repeating steps g(1)–g(2) n times; and h(1). setting said second potentiometer to a position P(i) which corresponds to a largest value of G(i).

3. A method of calibrating an optical sensor system as in claim 2 further comprising the steps of:

determining a largest value of E(i);

determining a largest value of F(i);

establishing a second midpoint threshold for said second color light equal to a sum of the largest value of E(i) and the largest value of F(i) divided by 2.

4. A method of calibrating an optical sensor system as in claim 3 further comprising the step of adding a predetermined value to said second midpoint threshold to establish a second upper threshold.

5. A method of calibrating an optical sensor system as in claim 3 further comprising the step of subtracting a predetermined value from said second midpoint threshold to establish a second lower threshold.

6. A method of calibrating an optical sensor system as in claim 1 further comprising the steps of:

determining a largest value of A(i);

determining a largest value of B(i);

establishing a first midpoint threshold for said first color light equal to a sum of the largest value of A(i) and the largest value of B(i) divided by 2.

7. A method of calibrating an optical sensor system as in claim 6 further comprising the step of adding a predetermined value to said first midpoint threshold to establish a first upper threshold.

8. A method of calibrating an optical sensor system as in claim 6 further comprising the step of subtracting a predetermined value from said first midpoint threshold to establish a first lower threshold.

9. An optical sensor for a thermal printer system including a printer having a dye donor web with a repeating series of spaced yellow, magenta, and cyan dye donor frames, and a receiver which receives dye from said yellow, magenta and cyan dye donor frames to form a colored image, such printer including a print head having a plurality of selectively energizable heating elements, means for moving said dye donor web and said receiver along respective paths so as to sequentially move each dye donor frame of a series and the receiver relative to the print head such that as the heating elements are selectively energized, dye from each dye donor frame of a series is transferred to the receiver and forms a color image on the receiver, means for identifying dye donor frames of such series comprising:

a first LED disposed adjacent to the dye donor web for illuminating a first dye donor frame with a first color light having a first wavelength;

a second LED disposed adjacent to the dye donor web for illuminating said first dye donor frame with a second color light having a second wavelength;

first and second spaced photodetectors disposed adjacent to the dye donor web and respectively responsive to an intensity of said first and second color lights which passes through said first dye donor frame for respectively providing electrical signals, the levels of such signals being proportional to the intensity of light which passes through said first dye donor frame;

a CPU which receives said electrical signals from said first and second photodetectors;

a first potentiometer for setting a gain on said first photodetector wherein said CPU sets:

a(1). said first potentiometer to a initial position P(i), wherein (i) equals a series of integers, and the series begins with the numeral 1;

a(2). initiates illumination of said first dye donor frame with said first color light, wherein said first dye donor frame blocks a substantial portion of said first color light, a(3). measures said electrical signals produced by said first photodetector proportional to the intensity of light transmitted through said first dye donor frame;

a(4). records said intensity as A(i);

a(5). increases i by 1 and repeating steps a(1)–a(5) n times, wherein n is a predetermined integer;

b(1). resets said first potentiometer to said initial position P(i);

b(2). initiates illumination of a second dye donor frame with said first color light, wherein said second dye donor frame transmits a substantial portion of said first color light;

b(3). measures said electrical signals produced by said first photodetector proportional to the intensity of light transmitted through said second dye donor frame;

b(4). records said intensity as B(i);

b(5). increases i by 1 and repeats steps b(1)–b(5) n times;

c(1). subtracts A(i) from B(i) and determines an absolute value C(i);

c(2). repeats steps c(1)–c(2) n times; and d(1). sets said first potentiometer to a position P(i) which corresponds to a largest value of C(i).

10. An optical sensor for a thermal printer system as in claim 9 wherein said CPU sets:

e(1). a second potentiometer for setting a gain on said second photodetector to an initial position P(i);

e(2). initiates illumination of said first dye donor frame with a second color light, wherein said first dye donor frame blocks a substantial portion of said second color light;

e(3). measures said electrical signals produced by said second photodetector proportional to the intensity of light transmitted through said first dye donor frame;

e(4). records said intensity as E(i);

e(5). increases i by 1 and repeating steps e(1)–e(5) n times;

f(1). resets said second potentiometer to said initial position P(i);

f(2). initiates illumination of said second dye donor frame with said second color light, wherein said second dye donor frame transmits a substantial portion of said second color light;

f(3). measures said electrical signals produced by said second photodetector proportional to the intensity of light transmitted through said second dye donor frame;

f(4). records said intensity as F(i);

f(5). increases i by 1 and repeating steps f(1)–f(5) n times;

g(1). subtracts E(i) from F(i) and determining an absolute value G(i);

g(2). repeats steps g(1)–g(2) n times; and h(1). sets said second potentiometer to a position P(i) which corresponds to a largest value of G(i).

11. An optical sensor for a thermal printer system as in claim 10 wherein said first and second potentiometers are digital potentiometers.

12. An optical sensor for a thermal printer system as in claim 9 wherein said CPU:

determines a largest value of A(i);

determines a largest value of B(i);

establishes as a first midpoint threshold for said first color light equal to a sum of the largest value of A(i) and the largest value of B(i) divided by 2.

13. An optical sensor for a thermal printer system as in claim 12 wherein said CPU adds a predetermined value to said first midpoint threshold to establish a first upper threshold.

14. An optical sensor for a thermal printer system as in claim 12 wherein said CPU subtracts a predetermined value from said first midpoint threshold to establish a first lower threshold.

15. An optical sensor for a thermal printer system as in claim 12 wherein said CPU:

determines a largest value of E(i);

determines a largest value of F(i);

establishes a second midpoint threshold for said second color light equal to a sun of the largest value of E(i) and the largest value of F(i) divided by 2.

16. An optical sensor for a thermal printer system as in claim 15 wherein said CPU adds a predetermined value to said second midpoint threshold to establish a second upper threshold.

17. An optical sensor for a thermal printer system as in claim 15 wherein said CPU subtracts a predetermined value from said second midpoint threshold to establish a second lower threshold.

18. An optical sensor for a thermal printer system as in claim 9 wherein analog to digital converters are located between said first and second photodetectors and said CPU.

* * * * *